3,331,948
OSCILLATING LIGHT SENSITIVE DEVICE FOR READING OSCILLOGRAPH TRACES
Robert F. X. Salmon, 9 Gerard Road, Yardville, N.J. 08620
Filed Feb. 8, 1963, Ser. No. 257,350
1 Claim. (Cl. 235—61.11)

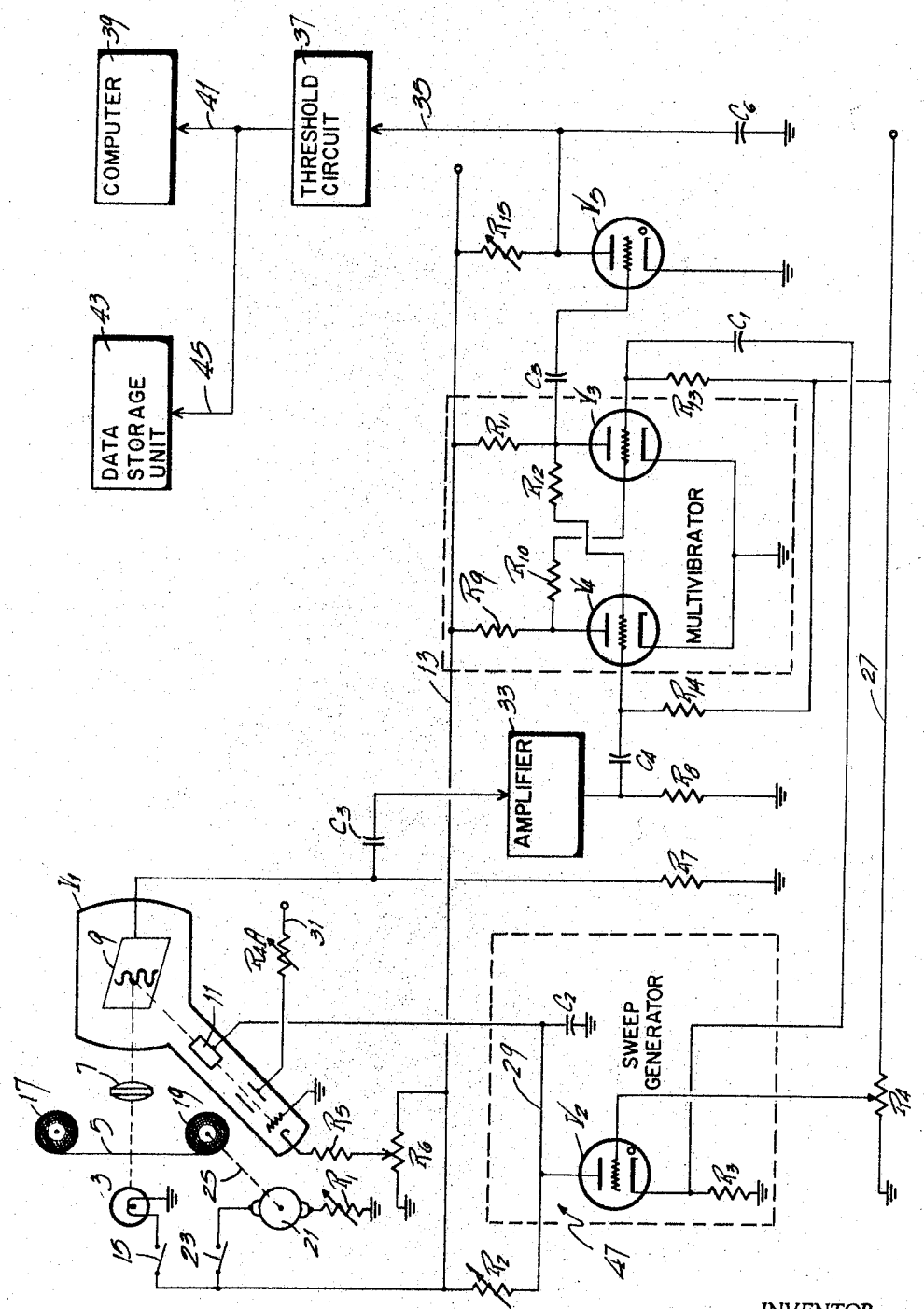

The invention described herein may be manufactured and used by or for the Government of the United States of America for governmental purposes without the payment of any royalties thereon or therefor.

The present invention relates to novel and improved data processing apparatus for automatically reading and interpreting data recorded in the form of oscillograph traces or the like.

In the measurement and analysis of the transient performance of various types of mechanical systems and the like such as an aircraft engine, continuous records of numerous parameters of the system is often required. The usual method of accumulating such data involves the automatic recording of a trace of each parameter on oscillograph paper. This is often an excellent method of obtaining the required data. The subsequent evaluation and analysis of the data, however, invariably is an involved time consuming process in which the introduction of numerous errors is often unavoidable.

It is therefore a principal object of the present invention to provide novel and improved apparatus for extracting specific data and information from continuous oscillographic traces.

It is a further object of the present invention to provide novel and improved apparatus for analyzing continuous oscillographic data which eliminates the laborious and error prone visual extraction and interpolation of the data.

Other objects and many of the attendant advantages of this invention will be readily appreciated as the same becomes better understood by reference to the following detailed description when considered in connection with the accompanying drawing wherein:

The single figure of the drawing is a diagrammatic view of a preferred embodiment of the present invention.

Referring to the drawing, light from the lamp 3 is directed through the oscillograph paper 5 and is focused by the lens system 7 on the photosensitive plate 9 of the iconoscope V-1. Lamp 3 is energized by a circuit that extends from the positive voltage power supply line 13 through switch 15 and the lamp to ground. The oscillograph paper 5 is guided in any suitable manner from reel 17 to take-up reel 19 between lamp 3 and the lens system 7. Motor 21 is energized by a circuit that extends from the power supply line 13 through power switch 23, the armature of the motor and speed control resistor R-1 to ground. Motor 21 drives reel 19 through the linkage mechanism diagrammatically shown at 25.

The plate circuit of thyratron V-2 extends from the power supply line 13 through variable resistor R-2, the tube and resistor R-3 to ground. The control grid of thyratron V-2 is coupled to the variable arm of resistor R-4 which is connected between the negative bias supply line 27 and ground. The cathode of thyratron V-2 is connected to the control grid of triode V-3 through condenser C-1. The plate of thyratron V-2 is coupled to the deflection circuitry 11 of the iconoscope V-1 through conductor 29 and to ground through condenser C-2. The plate circuit of iconoscope V-1 extends from the positive high voltage supply line 31 through variable resistor R-4, the tube and resistor R-5 to the variable arm of resistor R-6 which is connected between the power supply line 13 and ground. The control grid of the iconoscope V-1 is preferably connected directly to ground as shown. The photosensitive plate 9 of the iconoscope V-1 is coupled to amplifier 33 through resistor R-7 and condenser C-3. Amplifier 33 is in turn coupled to the control grid of triode V-4 through resistor R-8 and condenser C-4. The plate circuit of triode V-4 extends from the power supply line 13 through resistor R-9 and the tube to ground. The plate of triode V-4 is connected to the control grid of triode V-3 through resistor R-10. The plate circuit of triode V-3 extends from the power supply line 13 through resistor R-11 and the tube to ground. The plate of triode V-3 is connected to the control grid of triode V-4 through resistor R-12. The control grids of triodes V-3 and V-4 are respectively connected to the negative voltage supply line 27 through resistors R-13 and R-14. The plate of triode V-3 is coupled to the control grid of thyratron V-5 through condenser C-5. The plate circuit of thyratron V-5 extends from the positive voltage supply line 13 through resistor R-15 and the tube to ground. The plate of thyratron V-5 is coupled to ground through condenser C-6 and through conductor 35 to the threshold circuit 37 which is of any conventional design. The output circuit of threshold circuit 37 is coupled to the computer 39 through conductor 41 and to the data storage unit 43 through conductor 45. The specific design of the computer 39 of itself forms no part of the invention and varies depending upon the nature of the data analysis to be performed. Similarly, the data storage unit 43 may be of any conventional design or type such as a magnetic tape recorder or the like without departing from the spirit or scope of the invention.

In operation, when switch 23 is closed, the oscillograph trace recorded on the paper or other suitable medium 5 is transferred from reel 17 to reel 19 at a rate controlled by adjustment of resistor R-1. Switch 15 is then closed and light from lamp 3 is directed through the downwardly moving trace on paper 5, through the lens system 7 to the photosensitive plate 9 of the iconoscope V-1. The photosensitive plate 9 is simultaneously horizontally swept by electrons from the plate-cathode circuit of the iconoscope V-1 as condenser C-2 of the sawtooth generator circuit 47 successively charges and discharges the deflection circuits 11 of the iconoscope. Resistor R-2 provides adjustment of the operating frequency of the sawtooth generator and ultimately controls the number of points along the trace on paper 5 that are sampled. Resistor R-4 controls the charge developed across condenser C-2 before discharge through thyratron V-2 and therefore the amplitude of the horizontal deflection of the electron beam of the iconoscope V-1. In this way, proper adjustment of resistor R-4 assures a horizontal sweep that is adequate in amplitude to scan all points along the oscillograph trace.

Triodes V-3 and V-4 together with their associated circuits embody a conventional flip-flop multivibrator circuit. When thyratron V-2 fires and discharges condenser C-2 in preparation for each new horizontal sweep, a positive pulse from the cathode of thyratron V-2 is applied to the control grid of triode V-3 of the multivibrator. This energizes triode V-3. The resulting drop in potential at the plate of triode V-3 cuts off triode V-4 and thyratron V-5. When thyratron V-5 is deenergized, condenser C-6 begins to charge through resistor R-15. When the horizontally deflected electron beam of the iconoscope V-1 intersects the darkened portion of the image of the oscillograph trace on phoosensitive plate 9, the resulting electrical impulse is amplified by amplifier 33 and applied to the control grid of triode V-4. When this occurs, triode V-4 is energized and triode V-3 is cut off. The resulting increase in potential at the plate of triode V-3 fires thyratron V-5 and interrupts the charging cycle of condenser C-6. Thus, condenser C-6 begins to charge at the beginning of each horizontal sweep of the electron beam in iconoscope V-1 and continues to charge until the beam intersects the darkened portion of the oscillograph trace. Condenser C–6 then discharges and remains in its discharged state until the next horizontal sweep is initiated. The threshold circuit 37 coupled to the output circuit of condenser C–6 is energized in its conventional manner whenever the charge on condenser C–6 exceeds a predetermined magnitude. The output pulse of threshold circuit 37 when it is energized is then either recorded on a suitable tape recorder mechanism or the like in the data storage unit 43 for future use or it is fed directly into the computer 39 for immediate analysis of the data.

Obviously many modifications and variations of the present invention are possible in the light of the above teachings. It is therefore to be understood that within the scope of the appended claim the invention may be practiced otherwise than as specifically described.

What is claimed is:

Apparatus for extracting data from an oscillographic trace, said apparatus comprising:
(a) an iconoscope;
(b) means for projecting an image of the trace on the photosensitive plate of the iconoscope;
(c) a sweep generator for one of the deflection circuits of the iconoscope, said sweep generator including a thyratron, a first condenser and a resistor, the plate cathode circuit and the resistor being series connected and in parallel with the condenser;
(d) a multivibrator including a pair of triodes;
(e) means coupling the potential developed across the resistor to the control grid of one of the triodes of the multivibrator;
(f) means coupling the output potential of the iconoscope to the control grid of the other triode of the multivibrator;
(g) a second condenser;
(h) a second thyratron having a plate cathode circuit which is in parallel with the second condenser;
(i) means coupling the plate circuit of the one triode of the multivibrator to the control grid of the second thyratron;
(j) a threshold circuit coupled to the output circuit of the second condenser;
(k) and a computer for performing predetermined data analysis coupled to the output circuit of the threshold circuit.

References Cited
UNITED STATES PATENTS

| | | | |
|---|---|---|---|
| 2,663,857 | 12/1953 | Holcomb | 340—212 |
| 2,961,547 | 11/1960 | Snaveley | 250—219 |
| 3,033,990 | 5/1962 | Johnson | 250—219 |
| 3,248,553 | 4/1966 | Patterson | 250—219 |

MAYNARD R. WILBUR, *Primary Examiner.*

A. L. NEWMAN, R. COUNCIL, *Assistant Examiners.*